(12) United States Patent
Wu

(10) Patent No.: US 11,914,706 B2
(45) Date of Patent: Feb. 27, 2024

(54) CIRCUIT DESIGN METHOD AND ASSOCIATED CIRCUIT

(71) Applicant: REALTEK SEMICONDUCTOR CORPORATION, Hsinchu (TW)

(72) Inventor: Tzung-Juei Wu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 67 days.

(21) Appl. No.: 17/531,759

(22) Filed: Nov. 21, 2021

(65) Prior Publication Data

US 2022/0164439 A1 May 26, 2022

(30) Foreign Application Priority Data

Nov. 25, 2020 (TW) ................................ 109141369

(51) Int. Cl.
*G06F 21/71* (2013.01)
*G06F 21/55* (2013.01)

(52) U.S. Cl.
CPC ............ *G06F 21/554* (2013.01); *G06F 21/71* (2013.01)

(58) Field of Classification Search
CPC ............................... G06F 21/554; G06F 21/71
See application file for complete search history.

(56) References Cited

U.S. PATENT DOCUMENTS

| 8,308,819 | B2 * | 11/2012 | Kirschner | G06F 21/86 |
| | | | | 726/34 |
| 8,732,523 | B2 * | 5/2014 | Ozer | G06F 11/0787 |
| | | | | 714/30 |
| 9,122,871 | B2 * | 9/2015 | Bellahcene | G06F 21/554 |
| 11,068,589 | B2 * | 7/2021 | Hars | G06F 21/554 |
| 11,222,884 | B2 * | 1/2022 | Chang | H01L 25/0657 |
| 11,321,457 | B2 * | 5/2022 | Hershman | G06F 21/554 |
| 2008/0029786 | A1 * | 2/2008 | Fan | H01L 27/11807 |
| | | | | 257/209 |
| 2017/0116366 | A1 * | 4/2017 | Seo | G06F 30/23 |
| 2017/0213026 | A1 * | 7/2017 | Wu | G06F 21/76 |
| 2019/0179573 | A1 * | 6/2019 | Hsu | G06F 9/3879 |
| 2020/0043868 | A1 * | 2/2020 | Apte | G06F 21/554 |
| 2020/0168595 | A1 * | 5/2020 | Chang | H01L 27/0207 |
| 2021/0156918 | A1 * | 5/2021 | Mrugalski | G01R 31/318536 |

\* cited by examiner

*Primary Examiner* — Viral S Lakhia
(74) *Attorney, Agent, or Firm* — WPAT, P.C.; Anthony King

(57) ABSTRACT

The present application provides a circuit design method and an associated circuit. The circuit design method is for generating a circuit, and the method includes: arranging a plurality of attack detection circuits around a specific circuit unit, wherein the specific circuit unit is in the circuit; determining a number of a plurality of spare cells required by the circuit according to a number of the attack detection circuit; and placing the spare cells in the circuit according to the number of the spare cells.

16 Claims, 5 Drawing Sheets

100

CIRCUIT DESIGN METHOD AND ASSOCIATED CIRCUIT

CROSS-REFERENCE TO RELATED APPLICATIONS

This application claims priority of Taiwan application No. 109141369 filed on Nov. 25, 2020, which is incorporated by reference in its entirety.

TECHNICAL FIELD

The present application relates to a circuit design method; in particular, to a method and a related circuit for placing spare cells when there is an attack detection circuit.

BACKGROUND

In order to prevent the chip from hacking, many attack detection circuits are arranged inside the chip. The more the number of attack detection circuits, the more adequate protection is provided; on the other hand, it also consumes more area, resulting in higher costs. Therefore, how to offer the same level of protection to the chip without increasing the cost has become an urgent issue in this field.

SUMMARY OF THE INVENTION

The present disclosure discloses a circuit design method, which is configured to generate a circuit. The method includes: arranging a plurality of attack detection circuits around a specific circuit unit, wherein the specific circuit unit is in the circuit; determining a number of a plurality of spare cells required by the circuit according to a number of the plurality of attack detection circuits; and placing the plurality of spare cells in the circuit according to a number of the plurality of spare cells.

The present disclosure discloses a circuit, including a specific circuit unit; a plurality of attack detection circuits, disposed around the specific circuit unit; and a plurality of spare cells, wherein a number of the plurality of spare cells is determined according to a number of the plurality of attack detection circuits.

The above-mentioned circuit design method and related circuit can reduce the number of spare cells, thereby saving the chip's area.

DETAILED DESCRIPTION

Figure 1:
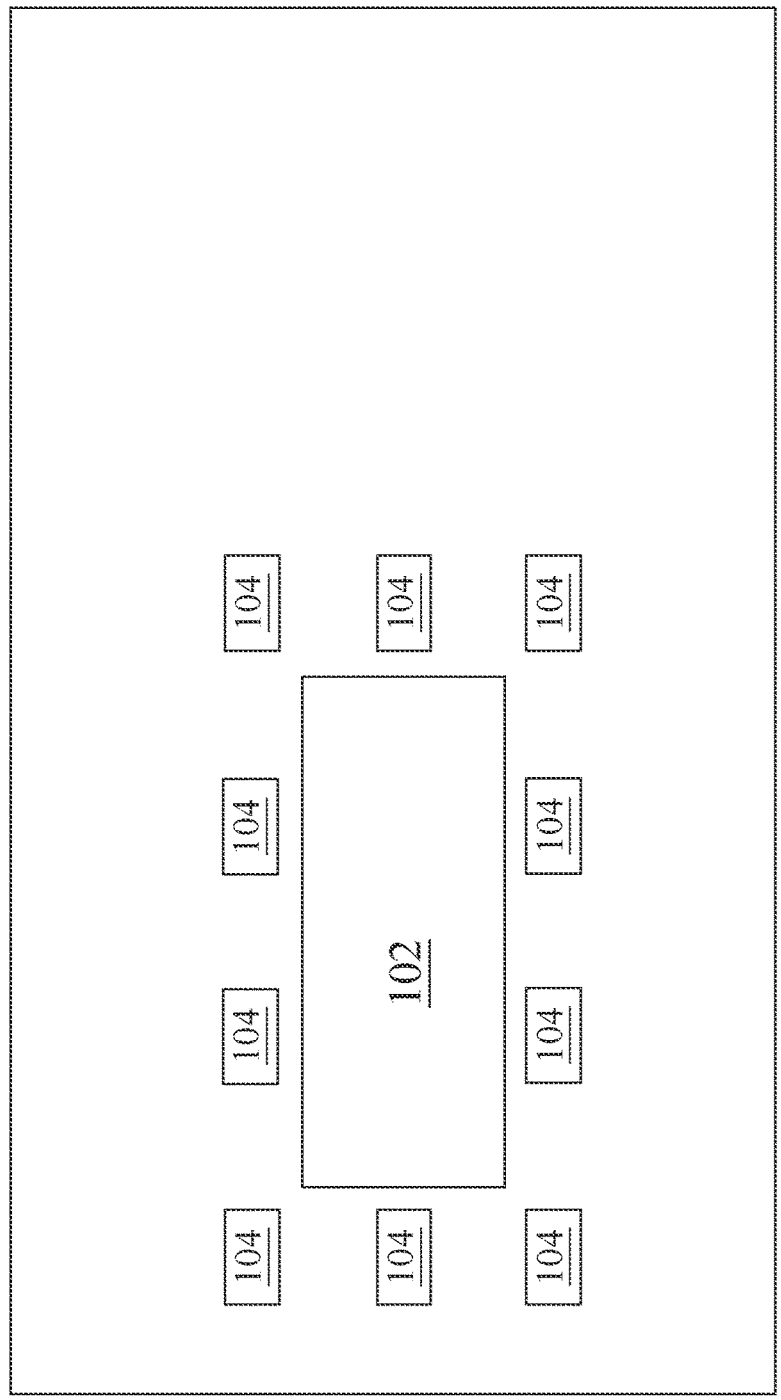
FIG. 1 is a schematic diagram illustrating a circuit layout.

The present disclosure provides a circuit design method, and the steps therein are illustrated in FIG. 1 to FIG. 2 and FIG. 4 to FIG. 5. FIG. 1 is a schematic diagram illustrating the layout of the circuit 100. The circuit 100 includes a specific circuit unit 102, the specific circuit unit 102 is a circuit that needs protection; for example, the specific circuit unit 102 is an encryption/decryption circuit. To prevent the hackers from opening the package of the circuit 100 and then using a probe to modify or access the data in the specific circuit unit 102 externally, a plurality of attack detection circuits 104 can be arranged in the circuit 100. In this way, one can detect the hacker's action when he modifies any one of attack detection circuits 104. The greater the number of the attack detection circuit 104, the easier it takes to detect the hacker's attack. However, for the sake of cost, the attack detection circuits 104 should be arranged with care. One approach is to place the attack detection circuits 104 around the specific circuit unit 102 whenever possible, as shown in FIG. 1. In the present embodiment, the attack detection circuits 104 equidistantly surround the specific circuit unit 102; however, the present disclosure is not limited thereto.

Figure 2:
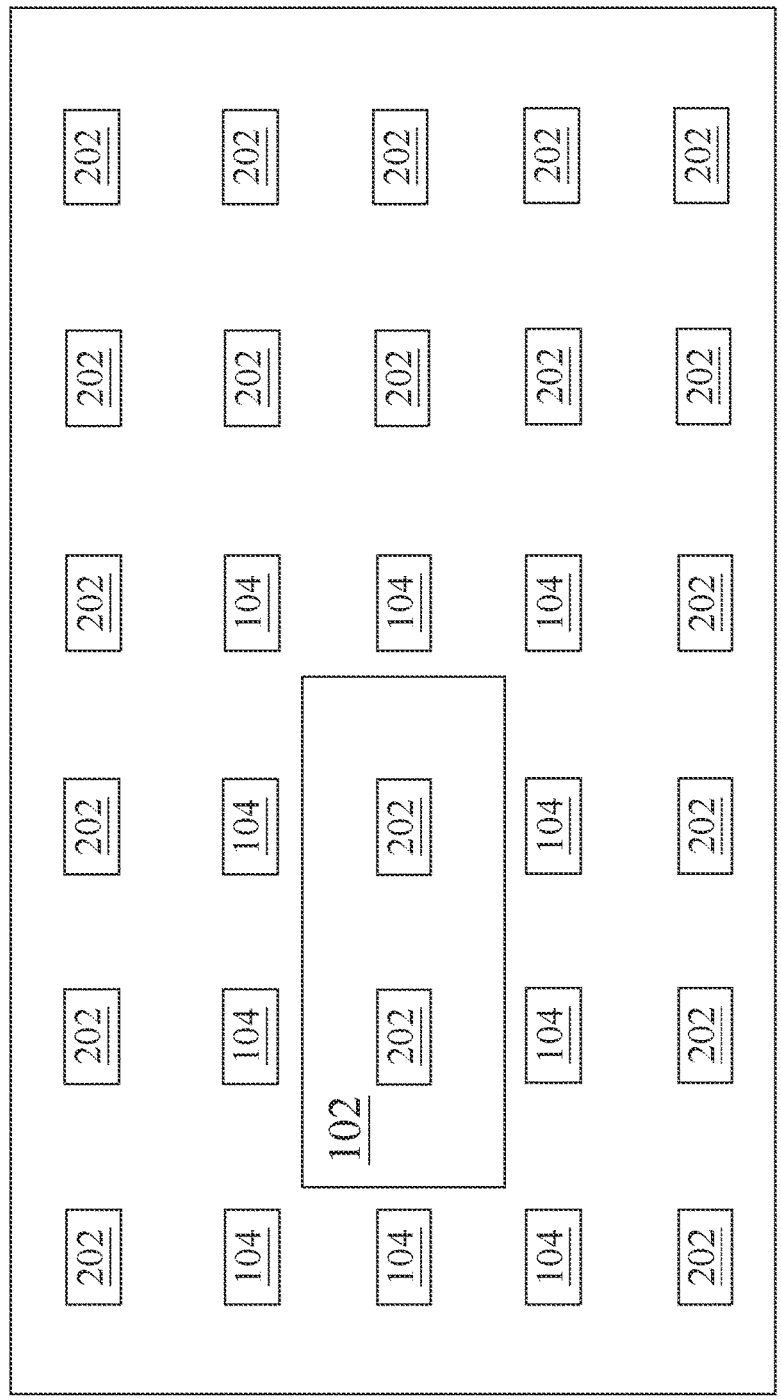
FIG. 2 is a schematic diagram illustrating a circuit according to an embodiment of the present disclosure.

Then, the circuit 100 further includes a plurality of spare cells 202, as shown in FIG. 2. The purpose of this is that after the circuit 100 is fabricated into a chip, when a design error is found or when a design change is desired, a portion of the plurality of spare cells 202 can be used with a change of routing to complete the design change, i.e., an engineering change order (ECO).

Both the attack detection circuit 104 and the spare cells 202 are preventive design, and the present disclosure combines the two to reduce the area of the circuit 100. Generally, the spare cells are uniformly arranged in a chip, and the number of spare cells depends on the area of the chip or the total number of cells in the chip, such as multiplying the area or the total number of cells by a fixed ratio, so that the larger the area or the greater the total number of cells, the greater the number of spare cells 202. In the present disclosure, the attack detection circuit 104 is considered to be used as spare cells 202 when needed; for example, various cells in the attack detection circuit 104 can be used as the spare cells 202 when needed. Therefore, when arranging the spare cells 202 shown in FIG. 2, one can determine the number and location of the spare cells 202 that are required for the circuit 100 according to the number and location of the attack detection circuit 104. Specifically, before determining the actual number of spare cells 202 to be arranged, one can first determine the number of spare cells 202 that would have been required (N1) originally according to the area of circuit 100 and/or the total number of cells in circuit 100 (e.g., the number of all cells in circuit 100 excluding the number of attack detection circuit 104 and spare cells 202). Since the attack detection circuit 104 in the present disclosure can be used as the spare cells when needed, the actual number of spare cells 202 (N2) is determined according to the number of the attack detection circuit 104 (N3). In the present disclosure, the number N2 must be less than the number N1, so the area of the circuit 100 can be reduced to reduce the cost.

For example, suppose that the number of spare cells 202 originally required in FIG. 2 is 30, but because a part of the area (i.e., the area around the specific circuit unit 102) is already covered by the attack detection circuit 104 with a number of 10, it means that when ECO is needed in these areas, the nearby attack detection circuit 104 can be used, so there is no need to arrange spare cells in those areas, and it is only necessary to arrange spare cells 202 in other areas that are not covered by the range of the attack detection circuit 104. In this embodiment, the actual number of spare cells 202 required is 20 by subtracting the 10 from the number 30, and only 20 spare cells 202 together with 10 attack detection circuits 104 are required to meet the ECO requirements, saving 10 spare cells 202 from the original number of spare cells 202 required (i.e., 30 spare cells).

Figure 3:
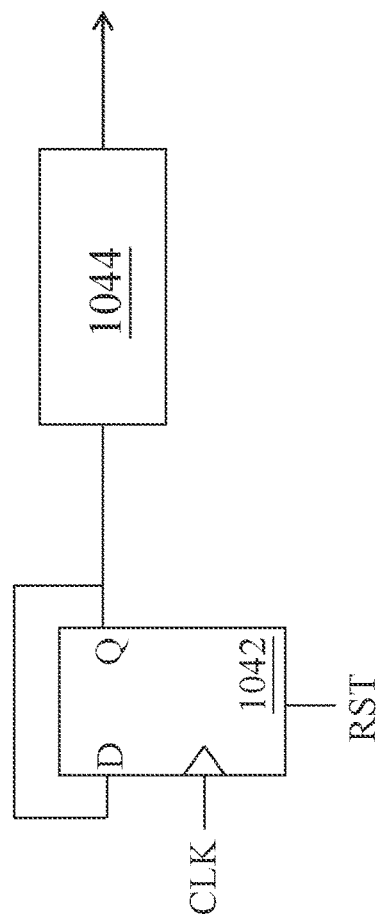
FIG. 3 is a schematic diagram illustrating an attack detection circuit according to an embodiment of the present disclosure.

FIG. 3 is a schematic diagram illustrating the embodiment of an attack detection circuit 104. Each attack detection circuit 104 is not coupled to the specific circuit unit 102. The flip-flop 1042 of each attack detection circuit 104 includes a data input terminal D that is coupled to an output terminal Q. When the circuit 100 operates in a normal state, the flip-flop 1042 s reset to a specific level, such as a low logic level (1'b0) or a high logic level (1'b1). A determination circuit 1044 is coupled to the flip-flop 1042 and is configured to determine whether the level of the flip-flop 1042 is maintained at the specific level. When the determination circuit 1044 discovers that the level of the flip-flop 1042 changes to a level different from the specific level, it determines that the circuit 100 has been physically intruded by a hacker and has mistakenly contacted the flip-flop 1042 thereby changing the specific level, and the determination circuit 1044 can correspondingly notify an upper layer of the system in which the circuit 100 locates to control the circuit 100 to enter an abnormal state, or it can control the circuit 100 to enter an abnormal state directly through a control circuit (not shown in the drawings in the circuit 100. It should be noted that FIG. 3 is only an illustration, and the implementation of the attack detection circuit 104 is not limited to this, as long as the same or similar function is achieved.

The circuit 100 in FIG. 2 can be implemented as a chip, and when the chip is tested or used in the real-world, one may find that the circuit 100 was originally designed with design flaws, or one may want to add new functions to the circuit 100. In such cases, one may perform the ECO process to the circuit 100. If the circuit to be modified is located near a certain attack detection circuit 104, the certain attack detection circuit 104 may be used for the ECO process. When the circuit to be modified is located near a certain spare cell 202, the certain spare cell 202 may be used to for the ECO process. Alternatively, one or more attack detection circuits 104 and one or more spare unit cells 202 may be used for the ECO process at the same time.

Figure 4:
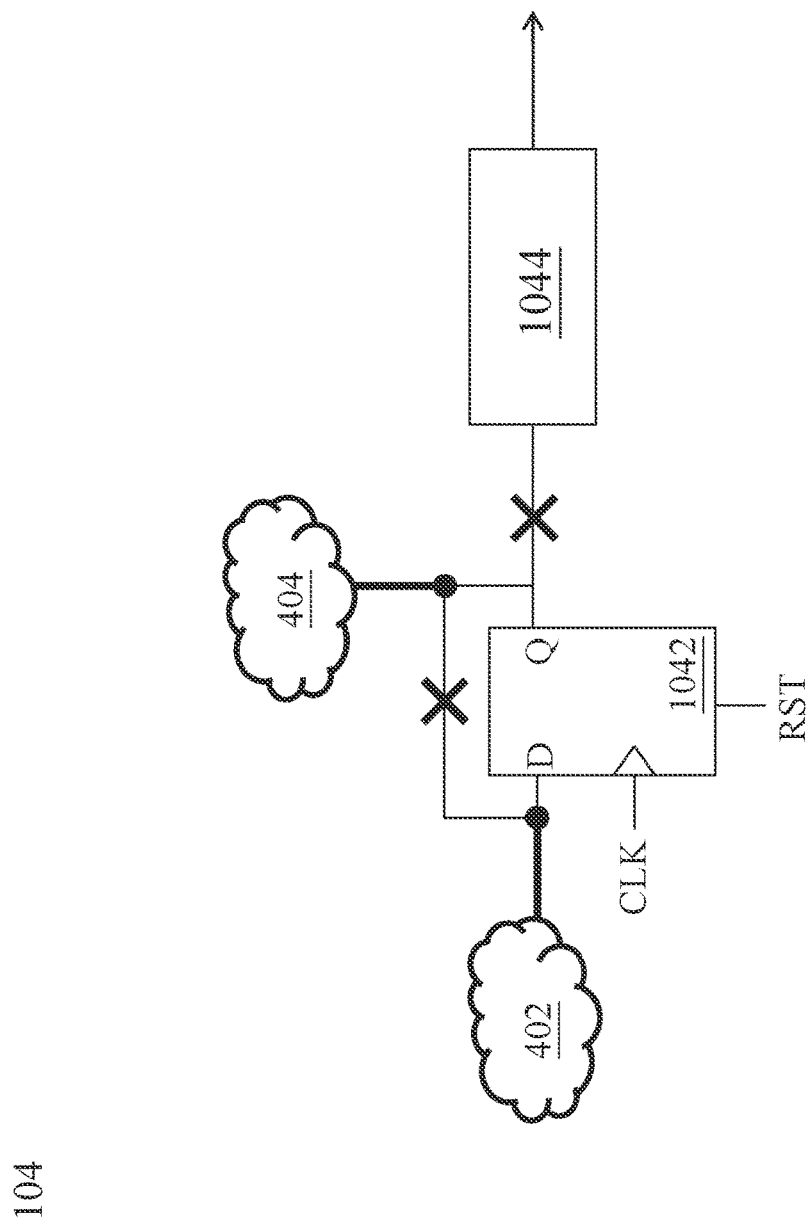
FIG. 4 is a schematic diagram illustrating utilizing the attack detection circuit for ECO according to a first embodiment of the present disclosure.

FIG. 4 is a schematic diagram illustrating the first embodiment of the present disclosure, which uses the attack detection circuit 104 to for the ECO process. In FIG. 4, the flip-flop 1042 is required to help the modification of the circuit 100 by first disconnecting the connection wire between the flip-flop 1042 and the determination circuit 1044, and then disconnecting the connection wire between the data input terminal D and the output terminal Q of the flip-flop 1042, and then the data input terminal D and the output terminal Q of the flip-flop 1042 can be connected to the other components 402 and 404 of the circuit 100 respectively through the newly added connection wires as required. It should be noted that FIG. 4 is only an example, and in some embodiments, it may be necessary to disconnect the flip-flop 1042 from the reset signal RST and the clock input signal CLK and connect them to other components depending on the desired design variation.

Figure 5:
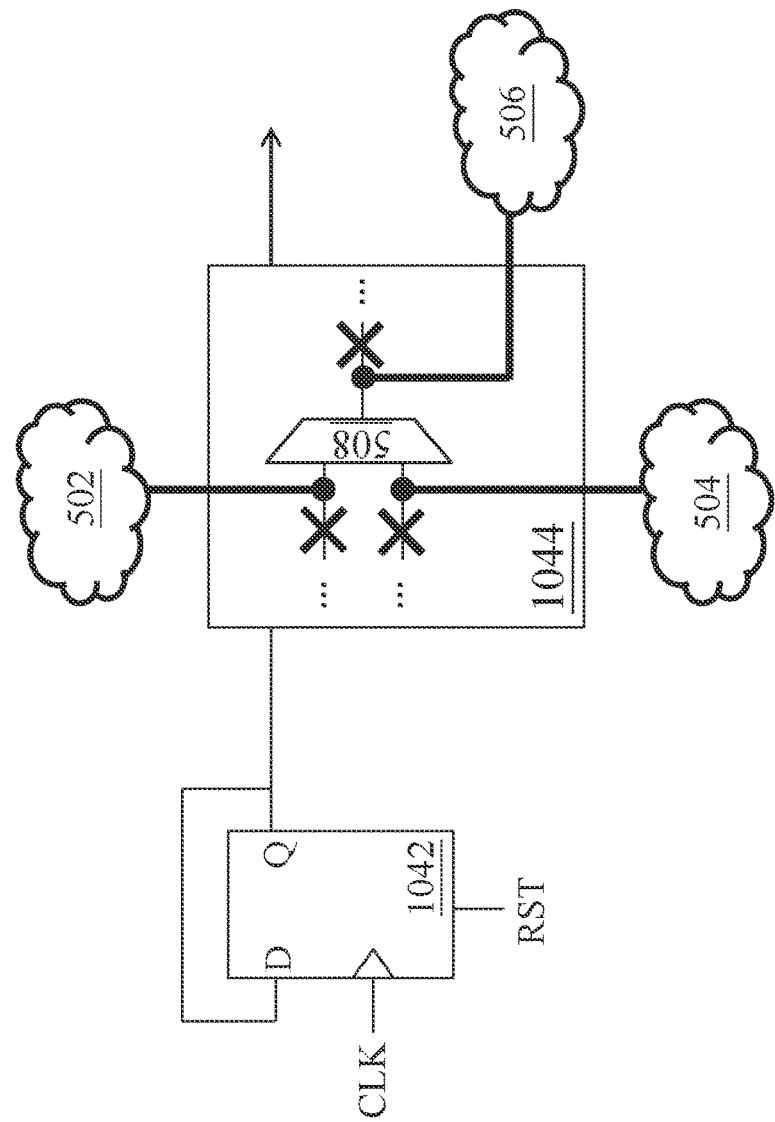
FIG. 5 is a schematic diagram illustrating utilizing the attack detection circuit for ECO according to a second embodiment of the present disclosure.

FIG. 4 is a schematic diagram illustrating the second embodiment of the present disclosure, which uses the attack detection circuit 104 to perform the ECO process. In FIG. 5, it is necessary to use a certain component in the determination circuit 1044 (for example, the multiplexer 508) to help the modification of the circuit 100 by first disconnecting the first input terminal, the second input terminal, and the output terminal of the multiplexer 508 from the components from which they were connected initially, and then, the first input terminal, the second input terminal, and the output terminal of the multiplexer 508 are respectively connected to the other components 502, 504, and 506 in the circuit 100 through newly-added connecting wires as required. It should be noted that FIG. 5 is only an example, and in fact, any component in the determination circuit 1044 can be used to perform the ECO process.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A circuit design method, configured to generate a circuit, the method comprising:
arranging a plurality of attack detection circuits around a specific circuit unit, wherein the specific circuit unit is in the circuit;
determining a number of a plurality of spare cells required by the circuit according to a number of the plurality of attack detection circuits; and
placing the plurality of spare cells in the circuit according to a number of the plurality of spare cells,
wherein the step of determining the number of the plurality of spare cells required by the circuit according to the number of the plurality of attack detection circuits comprises:
determining the number of the plurality of spare cells required by the circuit according to an area of the circuit and the number of the plurality of attack detection circuits, comprising:
determining a first number according to the area of the circuit;
obtaining a difference value by subtracting the number of the plurality of attack detection circuits from the first number; and
determining the number of the plurality of spare cells required by the circuit according to the difference value.

2. The circuit design method of claim 1, further comprising:
determining locations of the plurality of spare cells according to locations of the plurality of attack detection circuits.

3. The circuit design method of claim 2, wherein the step of placing the plurality of spare cells in the circuit according to the number of the plurality of spare cells comprises:
placing the plurality of spare cells in the circuit according to the number and the locations of the plurality of spare cells.

4. The circuit design method of claim 1, wherein the plurality of attack detection circuits are not coupled to the specific circuit unit.

5. The circuit design method of claim 4, wherein each of the plurality of attack detection circuits includes a flip-flop and a determination circuit electrically coupled to the flip-flop.

6. The circuit design method of claim 5, further comprising:
disconnecting the flip-flop and the determination circuit of one of the plurality of attack detection circuits.

7. The circuit design method of claim 6, further comprising:
electrically coupling the flip-flop of the one of the plurality of attack detection circuits to a first component in the circuit, wherein the first component is not the determination circuit of the one of the plurality of attack detection circuits.

8. The circuit design method of claim 6, further comprising:
electrically coupling the determination circuit of the one of the plurality of attack detection circuits to a second component in the circuit, wherein the second component is not the flip-flop of the one of the plurality of attack detection circuits.

9. A circuit, comprising:
a specific circuit unit;
a plurality of attack detection circuits, disposed around the specific circuit unit; and
a plurality of spare cells, wherein a number of the plurality of spare cells required by the circuit is determined according to the number of the plurality of attack detection circuits and a first number, wherein the first number is determined according to an area of the circuit,
wherein the number of the plurality of spare cells required by the circuit is determined according to a difference value obtained by subtracting the number of the plurality of attack detection circuits from the first number.

10. The circuit of claim 9, wherein locations of the plurality of spare cells are determined according to locations of the plurality of attack detection circuits.

11. The circuit of claim 9, wherein the plurality of attack detection circuits are not coupled to the specific circuit unit.

12. The circuit of claim 11, wherein each of the plurality of attack detection circuits includes a flip-flop and a determination circuit corresponding to the flip-flop and electrically coupled to the flip-flop.

13. The circuit of claim 12, wherein the flip-flop of each attack detection circuit is maintained at a specific level in a normal state.

14. The circuit of claim 13, wherein the specific level is a low logic level or high logic level.

15. The circuit of claim 14, wherein the plurality of determination circuits are configured to determine whether the level of the corresponding flip-flop is maintained at the specific level.

16. The circuit of claim 15, wherein when the level of the flip-flop of one of the plurality of attack detection circuits is changes to a level different from the specific level due to an attack, the corresponding determination circuit controls the circuit to enter an abnormal state.

* * * * *